May 19, 1964
F. W. WAKEFIELD
3,134,071
APPARATUS FOR LOCATING A FAULT IN THE INSULATION
AROUND THE CONDUCTOR OF AN ELECTRIC CABLE
Filed May 16, 1960
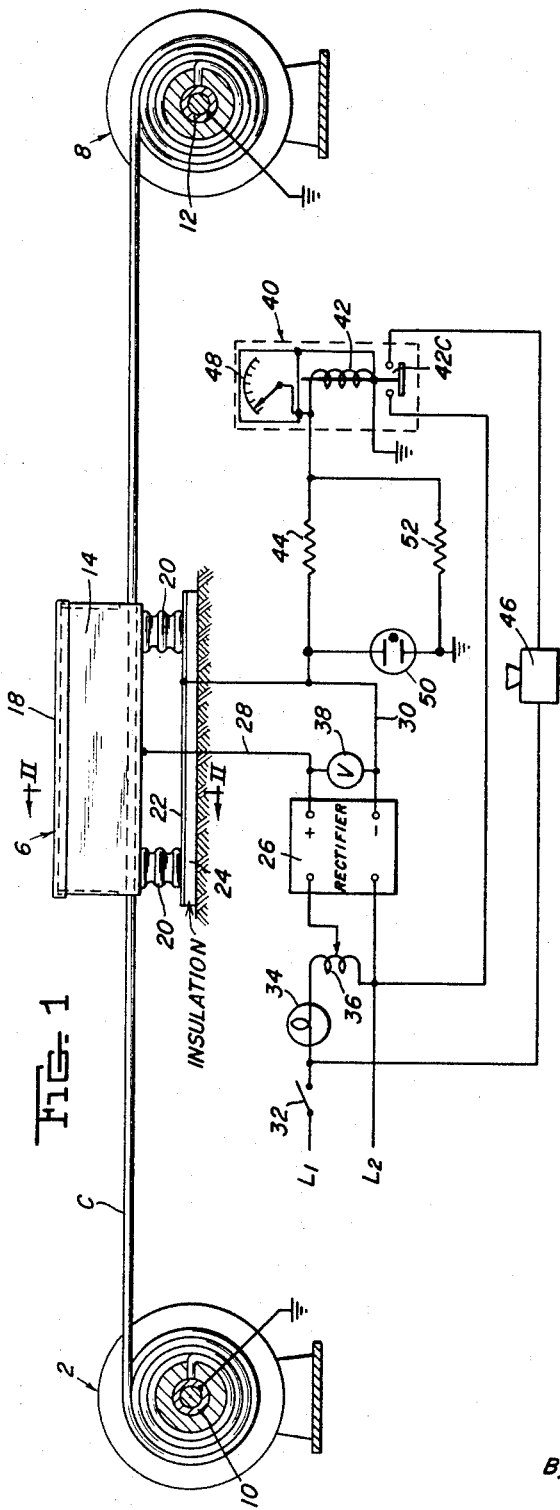
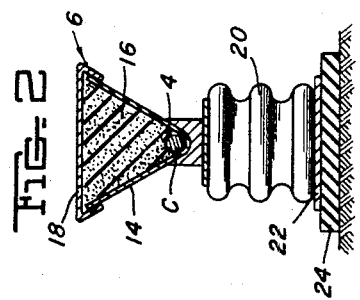
INVENTOR
FREDERICK W. WAKEFIELD
By Donald G. Dalton
Attorney

United States Patent Office 3,134,071
Patented May 19, 1964

3,134,071
APPARATUS FOR LOCATING A FAULT IN THE INSULATION AROUND THE CONDUCTOR OF AN ELECTRIC CABLE
Frederick W. Wakefield, Northboro, Mass., assignor to United States Steel Corporation, a corporation of New Jersey
Filed May 16, 1960, Ser. No. 29,281
6 Claims. (Cl. 324—54)

This invention relates to apparatus for locating a fault in electric cables and more particularly to such apparatus for locating insulation faults in a cable in which the insulation is the outer covering. The apparatus most commonly used for this purpose utilize sparkers such as shown in Abrams Patent No. 2,753,521 to test the cable as it passes from one reel to another. These devices require that a voltage failure or insulation puncture occur before a fault can be detected. However, it is possible for foreign material to be present in the insulation which will withstand a high sparker voltage, but will cause the cable to be rejected for low insulation resistance. It is also difficult with such apparatus to determine the specific location of such spots in long cable lengths. Furthermore, the sparkers do not locate spots where the insulation is of insufficient value.

It is therefore an object of my invention to provide an electric cable fault locator which will locate pin holes, spots of low electric strength, and spots of low insulation resistance where the insulation is not punctured as well as where the insulation is punctured.

This and other objects will be more apparent after referring to the following specification and attached drawings, in which:

FIGURE 1 is a schematic view of the apparatus of my invention; and

FIGURE 2 is an enlarged sectional view taken on the line II—II of FIGURE 1.

Referring more particularly to the drawings, reference numeral 2 indicates a pay-off reel for supporting an electric cable C to be tested. The cable C consists of a conductor 4 surrounded by insulation. The cable C passes from the pay-off reel 2 through a high voltage electrode 6 to a take-up reel 8 which is provided with the usual drive mechanism, not shown, for pulling the cable from reel 2 through the electrode 6. The end of conductor 4 on reel 2 is connected to slip ring 10 which in turn is connected to ground. The other end of conductor 4 is connected to a similar slip ring 12 on reel 8. The slip ring 12 is also connected to ground. While it is preferred to have both ends of conductor 4 connected to ground, cable may be tested with only one such end grounded. The electrode 6 consists of a plate 14 of metal or other conducting material bent into V-shape as shown and with the bottom thereof being rounded to receive the cable C. The interior of the plate 14 is filled with foam rubber 16 which is semi-conducting or which is made semi-conducting by coating with a semi-conducting fluid. The bottom of the foam rubber 16 is molded circular as shown so as to intimately contact the top of the cable C. The foam rubber 16 is held in firm engagement with the cable C by means of a clamp 18 which may be made of spring steel. The electrode 6 is supported by porcelain insulators 20 mounted on a conductive metal plate member 22 which is insulated from ground by insulation 24. A high voltage rectifier 26 has its positive terminal connected by means of lead 28 to the electrode 6 and its negative terminal connected by means of lead 30 to plate 22. A 115 volt A.C. power source L1, L2 is connected through switch 32, lamp 34 and a continuously adjustable auto transformer 36 to the rectifier 26. Closing of the switch 32 energizes the rectifier 26 with the lamp 34 limiting the current output of the rectifier to a safe value. The auto transformer 36 may be of any standard type, such as the General Radio Co. Variac and is used to vary the output voltage of rectifier 26. A volt meter 38 indicates the output voltage of rectifier 26. It will be understood that other types of high voltage D.C. power sources may be substituted for the rectifier 26. A meter-relay 40 of any standard type includes a relay coil 42 having one side connected through resistance 44 to lead 30 and the other side grounded. Relay coil 42 has a normally open contact 42C which is connected in series with a horn 46 to power source L1, L2. The meter-relay 40 also includes indicator pointer and scale 48. The meter relay is a well known device that includes an ammeter for indicating the flow of current and also means for opening or closing contacts at a predetermined setting of its indicator pointer. One particular meter relay, manufactured by Assembly Products, Inc., of Chesterland, Ohio, is shown on pages 3 and 4 of their Catalogue No. 4A, dated March 1956. A neon lamp 50 and resistance 52 are connected in series across resistance 44 to ground. If desired the resistor 52 may be changed to change the range of the equipment.

In operation with the switch 32 closed and cable passing from reel 2 to reel 8 leakage current from electrode 6 passes across the insulators 20 to the metal plate 22 and back to the negative terminal of the rectifier 26. The purpose of the conductive member 22 and the insulators 20 is to prevent small leakage current from the electrode 6 from flowing to ground through the meter relay 40 when there is no fault in the cable C, thus decreasing the range of resistance that can be measured by the meter relay 40 and/or causing operation of horn 46. Leakage current also passes through the cable insulation enclosed by the electrode 6 through resistor 44 and coil 42 to ground. The leakage current flowing through the insulation is indicated on the indicator 48. Knowing the voltage on the electrode 6, which is indicated by the volt meter 38 it is possible to determine the insulation resistance of the cable C within the electrode 6. For one particular set-up the resistance of resistor 44 is such that when rated current flows through coil 42 the sum of the voltage drop across resistor 44 and coil 42 is equal to about 65 volts. From the reading on indicator 48 it can be determined whether the resistance value of the insulation is within the specified range. Thus it can be determined from the meter reading whether the cable being tested is suitable for all uses, whether it is suitable for certain uses or whether it is ineffective to such a degree that it cannot be used. The sensitivity of the meter-relay 40 is selected so that when an insulation fault passes through the electrode 6, the current through the coil 42 will be sufficient to close contact 42C and sound the horn 46, thus indicating and locating the insulation fault. As can be seen from FIGURE 1 of the drawings, the complete circuit from rectifier 26 includes lead 30, resistor 44, meter relay 40 to ground, and lead 28, electrode 14, the cable fault, and the cable conductor to ground.

While one embodiment of my invention has been shown and described, it will be apparent that other adaptations and modifications may be made without departing from the scope of the following claims.

I claim:

1. Apparatus for locating a fault in the insluation around a conductor of an electric cable comprising means providing D.C. power, said means having two terminals, an electrode through which the cable passes in intimate contact therewith, means for passing the cable through said electrode, a conductive member spaced from said electrode, an insulator supported on said conductive member, said insulator supporting said electrode, means insulating said conductive member from ground, a lead connecting one of said terminals to said electrode, a lead connecting the other of said terminals to said conductive member, current responsive means having one terminal connected to the second named lead, means for grounding said conductor, and means connecting the other terminal of said current responsive means to ground, current from said means providing D.C. power flowing through said first named lead, said electrode, an insulation fault and said conductor to ground and from ground through said current responsive means to the said other terminal.

2. Apparatus for locating a fault in the insulation around a conductor of an electric cable comprising means providing D.C. power, said means having two terminals, an electrode through which the cable passes in intimate contact therewith, means for passing the cable through said electrode, a conductive member spaced from said electrode, an insulator supported on said conductive member, said insulator supporting said electrode, means insulating said conductive member from ground, a lead connecting one of said terminals to said electrode, a lead connecting the other of said terminals to said conductive member, means for grounding at least one end of the cable conductor, an ammeter, means connecting one terminal of said ammeter to the second named lead, and means connecting the other terminal of said ammeter to ground, current from said means providing D.C. power flowing through said first named lead, said electrode, an insulation fault and said conductor to ground and from ground through said ammeter to the said other terminal.

3. Apparatus for locating a fault in the insulation around a conductor of an electric cable comprising means providing D.C. power, said means having two terminals, an electrode through which the cable passes in intimate contact therewith, means for passing the cable through said electrode, a conductive member spaced from said electrode, an insulator supported on said conductive member, said insulator supporting said electrode, means insulating said conductive member from ground, a lead connecting one of said terminals to said electrode, a lead connecting the other of said terminals to said conductive member, a relay having a coil and a normally open contact, means connecting one terminal of said relay coil to the second named lead, means connecting the other terminal of said relay coil to ground, a power source, and a signal device connected in series with said contact to said power source, current from said means providing D.C. power flowing through said first named lead, said electrode, an insulation fault and said conductor to ground and from ground through said relay coil to the said other terminal of said means providing D.C. power.

4. Apparatus for locating a fault in the insulation around a conductor of an electric cable comprising means providing D.C. power, said means having two terminals, an electrode through which the cable passes and intimately contacts the cable insulation surface, a conductive member spaced from said electrode, an insulator supported on said conductor member, said insulator supporting said electrode, means insulating said conductive member from ground, a lead connecting one of said terminals to said electrode, a lead connecting the other of said terminals to said conductive member, a pay-off reel for supporting a length of cable to be tested, a take-up reel spaced from said pay-off reel for pulling said cable from said pay-off reel through said electrode, means for grounding at least one end of the cable conductor, current responsive means having one terminal connected to the second named lead, and means connecting the other terminal of said current responsive means to ground, current from said means providing D.C. power flowing through said first named lead, said electrode, an insulation fault and said conductor to ground and from ground through said current responsive means to the said other terminal of said means providing D.C. power.

5. Apparatus according to claim 4 in which said current responsive means is an ammeter.

6. Apparatus for locating a fault in the insulation around a conductor of an electric cable comprising means providing D.C. power, said means having two terminals, an electrode through which the cable passes and intimately contacts the cable insulation surface, a conductive member spaced from said electrode, an insulator supported on said conductive member, said insulator supporting said electrode, means insulating said conductive member from ground, a lead connecting one of said terminals to said electrode, a lead connecting the other of said terminals to said conductive member, a pay-off reel for supporting a length of cable to be tested, a take-up reel spaced from said pay-off reel for pulling said cable from said pay-off reel through said electrode, means for grounding at least one end of the cable conductor, a relay having a coil and a normally open contact, means connecting one terminal of said relay coil to the second named lead, means connecting the other terminal of said relay coil to ground, said relay coil having a normally open contact, a power source, and a signal device connected in series with said contact to said power source, current from said means providing D.C. power flowing through said first named lead, said electrode, an insulation fault and said conductor to ground and from ground through said relay coil to the said other terminal of said means providing D.C. power.

References Cited in the file of this patent

UNITED STATES PATENTS

| | | |
|---|---|---|
| 1,407,693 | Heany | Feb. 28, 1922 |
| 2,360,944 | Fruth | Oct. 24, 1944 |
| 2,485,871 | Entwistle | Oct. 25, 1949 |
| 2,837,714 | Hill | June 3, 1958 |
| 2,882,491 | Gooding | Apr. 14, 1959 |
| 2,882,492 | Gooding | Apr. 14, 1959 |
| 2,894,204 | Gambrill | July 7, 1959 |
| 2,900,597 | Gooding | Aug. 18, 1959 |

FOREIGN PATENTS

| | | |
|---|---|---|
| 545,916 | Canada | Sept. 10, 1957 |
| 473,045 | Germany | Mar. 11, 1929 |
| 850,922 | Germany | Sept. 29, 1952 |